United States Patent
Tang et al.

(10) Patent No.: US 9,530,047 B1
(45) Date of Patent: Dec. 27, 2016

(54) METHOD AND SYSTEM FOR FACE IMAGE RECOGNITION

(71) Applicant: Beijing SenseTime Technology Development Co., Ltd., Haidian District (CN)

(72) Inventors: Xiaoou Tang, Shatin (CN); Yi Sun, Shatin (CN); Xiaogang Wang, Shatin (CN)

(73) Assignee: BEIJING SENSETIME TECHNOLOGY DEVELOPMENT CO., LTD., Haidian District (CN)

( * ) Notice: Subject to any disclaimer, the term of this patent is extended or adjusted under 35 U.S.C. 154(b) by 0 days.

(21) Appl. No.: 15/039,956

(22) PCT Filed: Nov. 30, 2013

(86) PCT No.: PCT/CN2013/088254
§ 371 (c)(1),
(2) Date: May 27, 2016

(87) PCT Pub. No.: WO2015/078018
PCT Pub. Date: Jun. 4, 2015

(51) Int. Cl.
*G06K 9/00* (2006.01)
*G06K 9/66* (2006.01)
(Continued)

(52) U.S. Cl.
CPC ....... *G06K 9/00288* (2013.01); *G06K 9/00281* (2013.01); *G06K 9/4604* (2013.01);
(Continued)

(58) Field of Classification Search
CPC .............. G06K 9/00288; G06K 9/4628; G07C 9/00079
See application file for complete search history.

(56) References Cited

U.S. PATENT DOCUMENTS 6,128,398 A * 10/2000 Kuperstein ........ G07C 9/00079
382/116
2006/0034495 A1   2/2006 Miller et al.
(Continued)

FOREIGN PATENT DOCUMENTS

CN            101334839 A    12/2008
WO PCT/CN2013/088254       11/2013

OTHER PUBLICATIONS

International Search Report issued on Sep. 4, 2014 for International Application PCT/CN2013/088254, filed on Nov. 30, 2013 and published as WO 2015/078018 on Jun. 4, 2015 (Applicant—Beijing Sensetime Tech. Dev. Co., Ltd. // Inventor—Tang, et al.) (3 pages).
(Continued)

*Primary Examiner* — Manuchehr Rahmjoo
(74) *Attorney, Agent, or Firm* — Ballard Spahr LLP (57) ABSTRACT

A method for face image recognition is disclosed. The method comprises generating one or more face region pairs of face images to be compared and recognized; forming a plurality of feature modes by exchanging the two face regions of each face region pair and horizontally flipping each face region of each face region pair; receiving, by one or more convolutional neural networks, the plurality of feature modes, each of which forms a plurality of input maps in the convolutional neural network; extracting, by the one or more convolutional neural networks, relational features from the input maps, which reflect identity similarities of the face images; and recognizing whether the compared face images belong to the same identity based on the extracted relational features of the face images. In addition, a system for face image recognition is also disclosed.

13 Claims, 4 Drawing Sheets

(51) Int. Cl.
 *G06K 9/46* (2006.01)
 *G06K 9/62* (2006.01)
(52) U.S. Cl.
 CPC ......... *G06K 9/4652* (2013.01); *G06K 9/6257* (2013.01); *G06K 9/66* (2013.01)

(56) References Cited

U.S. PATENT DOCUMENTS

| | | | |
|---|---|---|---|
| 2011/0222724 | A1 | 9/2011 | Yang et al. |
| 2012/0288167 | A1* | 11/2012 | Sun .................. G06K 9/00281 382/118 |
| 2016/0275341 | A1* | 9/2016 | Li .................. G06K 9/00288 |

OTHER PUBLICATIONS

Written Opinion issued on Sep. 5, 2014 for International Application PCT/CN2013/088254, filed on Nov. 30, 2013 and published as WO 2015/078018 on Jun. 4, 2015 (Applicant—Beijing Sensetime Tech. Dev. Co., Ltd. // Inventor—Tang, et al.) (5 pages).
Li et al, Probabilistic Models for Inference about Identity, IEEE Transactions on Pattern Analysis and Machine Intelligence, vol. 34, No. 1, Jan. 2012 pp. 144-157 (14 Pages).
Ahonen et al, Face Description with Local Binary Patterns: Application to Face Recognition, IEEE Transactions on Pattern Analysis and Machine Intelligence, vol. 28, No. 12, Dec. 2006 pp. 2037-2041 (5 Pages).
Krizhevsky et al, ImageNet Classification with Deep Convolutional Neural Networks, Advances in Neural Information Processing Systems, 2012 (9 Pages).
Huang et al, Large Scale Strongly Supervised Ensemble Metric Learning, with Applications to Face Verification and Retrieval, arXiv:1212.6094v1 [cs.CV] Dec. 25, 2012 (8 Pages).
Ciresan et al, Multi-column Deep Neural Networks for Image Classification, CVPR '12 Proceedings of the 2012 IEEE Conference on Computer Vision and Pattern Recognition (CVPR) pp. 3642-3649.
Chen et al, Blessing of Dimensionality: High-dimensional Feature and Its Efficient Compression for Face Verification, IEEE Computer Society Conference on Computer Vision and Pattern Recognition • May 2013 (8 pages).
Chen et al, Bayesian Face Revisited: A Joint Formulation, ECCV 2012 (14Pages).
Huang et al, Labeled Faces in the Wild: A Database for Studying Face Recognition in Unconstrained Environments, University of Massachusetts, Amherst, Tech. Rep., Oct. 2007(11 Pages).
Hinton, et al, A fast learning algorithm for deep belief nets, Neural Comput. Jul. 2006;18(7):1527-54. (16 Pages).
Guillaumin et al, Is that you? Metric Learning Approaches for Face Identification, 2009 IEEE 12th International Conference on Computer Vision pp. 498-505 (8 Pages).
Nguyen et al, Cosine Similarity Metric Learning for Face Verification, Computer Vision—ACCV 2010, vol. 6493 of the series Lecture Notes in Computer Science pp. 709-720 (12 Pages).
Huang et al, Learning Hierarchical Representations for Face Verification with Convolutional Deep Belief Networks, CVPR '12 Proceedings of the 2012 IEEE Conference on Computer Vision and Pattern Recognition (CVPR) pp. 2518-2525 (8 Pages).
Simonyan et al, Fisher Vector Faces in the Wild, British Machine Vision Conference, 2013 (12 Pages).
Larochelle et al, Learning Algorithms for the Classification Restricted Boltzmann Machine, Journal of Machine Learning Research 13 (2012) 643-669 (27 Pages).
Wiskott et al, Face Recognition by Elastic Bunch Graph Matching, In Intelligent Biometric Techniques in Fingerprint and Face Recognition, eds. L.C. Jain et al., publ. CRC Press, ISBN 0-8493-2055-0, Chapter 11, pp. 355-396, (1999) (23 Pages).
LeCun et al, Gradient-Based Learning Applied to Document Recognition, Proc. of the IEEE, Nov. 1998 (46 Pages).
Wolf et al, Descriptor Based Methods in the Wild, Faces in Real-Life Images workshop at the European Conference on Computer Vision (ECCV), Oct. 2008 (14 Pages).
Lowe, Distinctive Image Features from Scale-Invariant Keypoints, International Journal of Computer Vision, Nov. 2004, vol. 60, Issue 2, pp. 91-110 (28 Pages).
Ojala et al, Multiresolution Gray-Scale and Rotation Invariant Texture Classification with Local Binary Patterns, IEEE Transactions on Pattern Analysis and Machine Intelligence, vol. 24, No. 7, Jul. 2002 (17 Pages).
Cox et al, Beyond Simple Features: A Large-Scale Feature Search Approach to Unconstrained Face Recognition, Automatic Face & Gesture Recognition and Workshops (FG 2011), 2011 IEEE International Conference Mar. 2011 pp. 8-15 (8 Pages).
Yin et al, An Associate-Predict Model for Face Recognition, CVPR '11 Proceedings of the 2011 IEEE Conference on Computer Vision and Pattern Recognition, pp. 497-504 (8 pages).
Chopra et al, Learning a Similarity Metric Discriminatively, with Application to Face Verification, CVPR '05 Proceedings of the 2005 IEEE Computer Society Conference on Computer Vision and Pattern Recognition (CVPR'05)—vol. 1, pp. 539-546 (8 pages).
Sun et al, Deep Convolutional Network Cascade for Facial Point Detection, CVPR '13 Proceedings of the 2013 IEEE Conference on Computer Vision and Pattern Recognition pp. 3476-3483 (8 Pages).
Wang, et al, A Unified Framework for Subspace Face Recognition, IEEE Transactions on Pattern Analysis and Machine Intelligence, vol. 26, No. 9, Sep. 2004 pp. 1222-1228 (7 pages).
Wang, et al, Dual-Space Linear Discriminant Analysis for Face Recognition, Proceedings of the 2004 IEEE Computer Society Conference on Computer Vision and Pattern Recognition pp. 564-569 (6 Pages).
Wang et al, Ranom Sampling for Subspace Face Recognition, International Journal of Computer Vision 70(1), 91-104, 2006 (14 Pages).
Taigman et al, Multiple One-Shots for Utilizing Class Label Information, 2009 (12 Pages).
Zhu et al, Deep Learning Identity-Preserving Face Space, ICCV '13 Proceedings of the 2013 IEEE International Conference on Computer Vision, pp. 113-120 (8 Pages).
Cao et al, Face Recognition with Learning-based Descriptor, IERI Procedia ,vol. 2, 2012, pp. 114-119 (8 Pages).
International Preliminary Report on Patentability dated May 31, 2016 for International Application No. PCT/CN2013/088254, which was filed on Nov. 30, 2013 and published as WO 2015/078018 on Jun. 4, 2015 (Inventor—Tang et al., Applicant—Beijing Sensetime Tech Dev. Co., Ltd (3 Pages)(5 Pages).

\* cited by examiner

METHOD AND SYSTEM FOR FACE IMAGE RECOGNITION

CROSS-REFERENCE TO RELATED APPLICATIONS

This application is a national phase filing of International patent application No. PCT/CN2013/088254, filed on Nov. 30, 2013, which is herein incorporated by reference in its entirety.

TECHNICAL FIELD

The present application generally relates to a field of image processing, in particular, to a method and a system for face image recognition.

BACKGROUND

The fundamental of face image recognition is verifying whether two compared faces belong to the same identity or not based on biological features. Recognized with other traditional means of recognition, such as fingerprint recognition, the face image recognition may be accurate, easy-to-use, difficult to counterfeit, cost-effective and non-intrusive, and thus it is widely used for safety applications. Face image recognition has been extensively studied in recent decades. Existing methods for face image recognition generally comprises two steps: feature extraction and recognition. In the feature extraction stage, a variety of hand-crafted features are used. More importantly, the existing methods extract features from each face image separately and compare them later at the face recognition stage. However, some important correlations between the two compared face images may have been lost at the feature extraction stage.

At the recognition stage, classifiers are used to classify two face images as having the same identity or not, or other models are employed to compute the similarities of two face images. The purpose of these models is to separate inter-personal variations and intra-personal variations. However, all of these models have shallow structures. To handle large-scale data with complex distributions, large amount of over-completed features may need to be extracted from the faces. Moreover, since the feature extraction stage and the recognition stage are separate, they cannot be jointly optimized. Once useful information is lost in the feature extraction stage, it cannot be recovered in the recognition stage.

SUMMARY

The present application proposes a solution to directly and jointly extract relational features from face region pairs derived from the compared face images under the supervision of face identities. Both feature extraction and recognition stages are unified under single deep network architecture and all the components may be jointly optimized for face recognition.

In an aspect of the present application, a method for face image recognition is disclosed. The method may comprise: generating one or more face region pairs of face images to be compared and recognized; forming a plurality of feature modes by exchanging the two face regions of each face region pair and horizontally flipping each face region of each face region pair; receiving, by one or more convolutional neural networks, the plurality of feature modes, each of which forms a plurality of input maps in each of the convolutional neural networks; extracting hierarchically, by the one or more convolutional neural networks, identity relational features from the input maps, where the extracted global and high-level identity relational features reflect identity similarities of the compared face images; and recognizing whether the face images belong to same identity based on the identity relational features of the compared face images.

In another aspect of the present application, a system for face image recognition is disclosed. The system may comprise a generating unit, a forming unit, one or more convolutional neural networks, a pooling unit and a recognizing unit. The generating unit may be configured to generate one or more face region pairs of face images to be compared and recognized. The forming unit may be configured to form a plurality of feature modes by exchanging the two face regions of each face region pair and horizontally flipping each face region of each face region pair. The one or more convolutional neural networks may be configured to receive the plurality of feature modes, each of which forms a plurality of input maps, and to extract identity relational features hierarchically from the plurality of input maps, where the global and high-level identity relational features reflect identity similarities of the face images. The pooling unit may be configured to pool the correlated relational features to derive stable and compact relational features. The recognizing unit may be configured to recognize whether the face images belong to same identity based on the identity relational features of the face images.

In another aspect of the present application, a plurality of convolutional neural networks for extracting identity relational features for a face image recognition system is disclosed. Each of the convolutional neural networks may comprise a plurality of convolutional layers; the relational features may comprise local low-level relational features and global high-level relational features. Each of the convolutional neural networks may be configured to receive a plurality of feature modes from the face image recognition system. Each feature mode forms a plurality of input maps in the convolutional neural network. The convolutional neural networks extract local low-level relational features from the input maps in lower convolutional layers and extract global high-level relational features based on the extracted local low-level relational features in subsequent feature extracting layers, which reflect identity similarities of the compared face images.

BRIEF DESCRIPTION OF THE DRAWING

Exemplary non-limiting embodiments of the invention are described below with reference to the attached drawings. The drawings are illustrative and generally not to an exact scale.

DETAILED DESCRIPTION

Reference will now be made in detail to exemplary embodiments, examples of which are illustrated in the accompanying drawings. When appropriate, the same reference numbers are used throughout the drawings to refer to the same or like parts.

Figure 1:
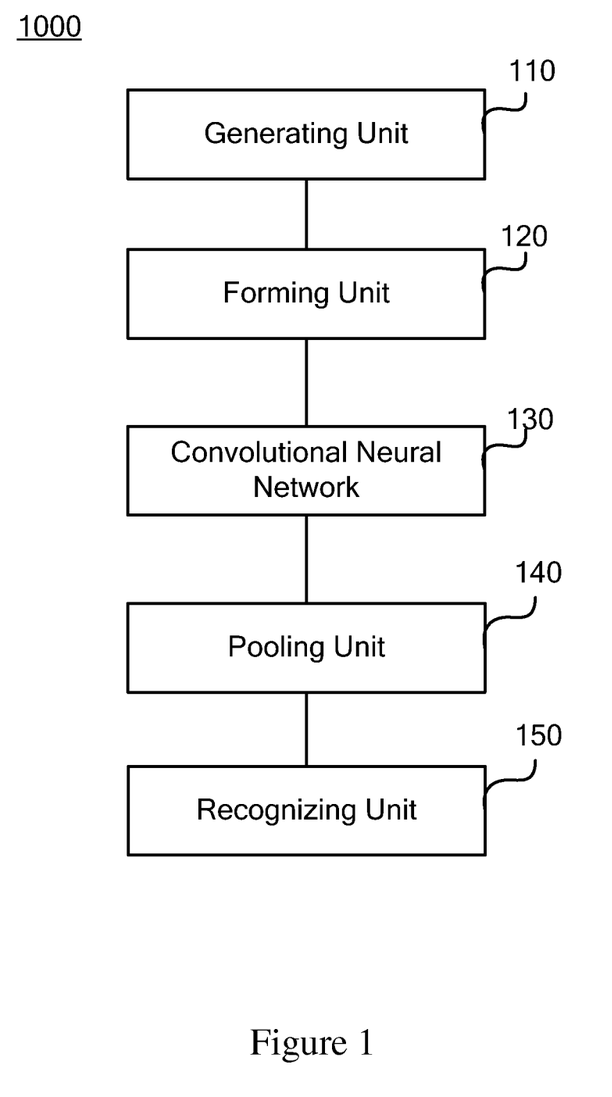
FIG. 1 is a schematic diagram illustrating a system for face image recognition consistent with some disclosed embodiments.

FIG. 1 is a schematic diagram illustrating a system 1000 for face image recognition consistent with some disclosed embodiments. The system 1000 may include one or more general purpose computer, one or more computer cluster, one or more mainstream computer, one or more computing device dedicated for providing online contents, or one or more computer network comprising a group of computers operating in a centralized or distributed fashion.

As shown in FIG. 1, the system 1000 according to one embodiment of the present application may include a generating unit 110, a forming unit 120, one or more convolutional neural networks 130, a pooling unit 140, and a recognizing unit 150.

Figure 2:
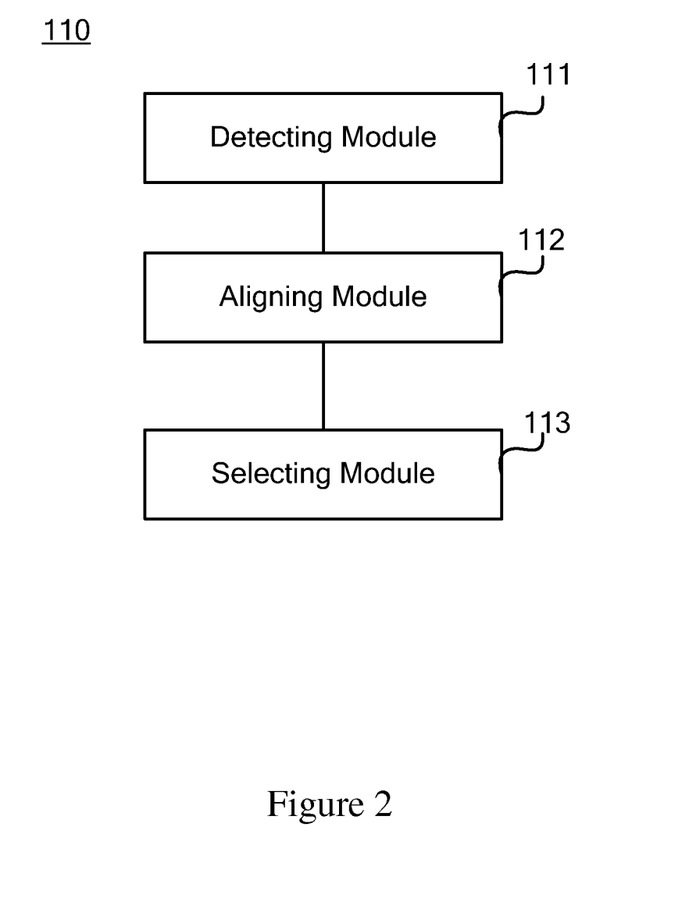
FIG. 2 is a schematic diagram illustrating a generating unit consistent with some disclosed embodiments.

The generating unit 110 may be configured to generate one or more face region pairs of face images to be recognized. In an embodiment of the present application, the generating unit 110 may include a detecting module 111, an aligning module 112 and a selecting module 113, as shown in FIG. 2. The detecting module 111 may detect a plurality of facial feature points of face images to be recognized. For example, the facial feature points may be the two eyes centers and the mouth center. The aligning module 112 may align the face images to be recognized according to the detected facial feature points. In an embodiment of the present application, the face images may be aligned by similarity transformation according to the facial feature points. Furthermore, the selecting module 113 may select one or more regions on the same position of the aligned face images to be recognized to generate one or more face region pairs, respectively. The positions of the selected face regions can be varied in order to form a plurality of different face region pairs.

The forming unit 120 may be configured to form a plurality of feature modes by exchanging the two face regions of each face region pair and horizontally flipping each face region of each face region pair. For example, eight modes may be formed by exchanging the two face regions and horizontally flipping each face region in an embodiment.

Figure 4:
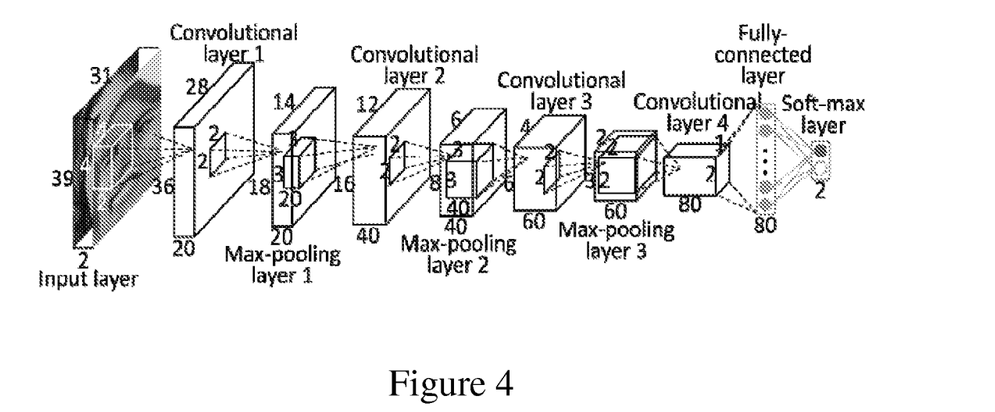
FIG. 4 is a schematic diagram illustrating architecture of the convolutional neural networks consistent with some disclosed embodiments.

The one or more convolutional neural networks 130 may be configured to receive the plurality of feature modes. Each feature mode may form a plurality of input maps. The convolutional neural networks extract identity relational features hierarchically from the plurality of input maps. The extracted global and high-level relational features in higher convolutional layers of the convolutional neural networks reflect identity similarities of the compared face images. As shown in FIG. 4, in an embodiment of the present application, the convolutional neural network 130 may comprise a plurality of convolutional layers, such as 4 convolutional layers in this embodiment. The convolutional layers may extract identity relational features hierarchically. In addition, the relational features may comprise local low-level relational features and global high-level relational features. Each of the convolutional neural networks is further configured to extract local low-level relational features from the input maps in lower convolutional layers, and to extract global high-level relational features based on the extracted local low-level relational features in subsequent feature extracting layers, which reflect identity similarities of the compared face images.

Additionally, in an embodiment of the present application, the convolutional neural networks may be divided into a plurality of groups, such as 12 groups, with a plurality of convolutional neural networks, such as five convolutional neural networks, in each group. Each convolutional neural network takes a pair of aligned face regions as input. Its convolutional layers extract the identity relational features hierarchically. Finally, the extracted relational features pass a fully connected layer and are fully connected to an output layer, such as the softmax layer, which indicates whether the two regions belong to the same identity, as shown in FIG. 4. The input region pairs for convolutional neural networks in different groups differ in terms of region ranges and color channels to make their predictions complementary. When the size of the input regions changes in different groups, the input map sizes in the following layers of the convolutional neural network will change accordingly. Although convolutional neural networks in the same group take the same kind of region pair as input, they are different in that they are trained with different bootstraps of the training data. The purpose of constructing multiple groups of convolutional neural networks is to achieve robustness of predictions.

In addition, in an embodiment, a pair of gray regions forms two input maps of a convolutional neural network, while a pair of color regions forms six input maps, replacing each gray map with three maps from RGB channels. The input regions are stacked into multiple maps instead of being concatenated to form one map, which enables the convolutional neural network to model the relations between the two regions from the first convolutional stage.

According to an embodiment, operations in each convolutional layer of the convolutional neural network can be expressed to $$y_j^r = \max\left(0, b_j^r + \sum_i k_{ij}^r * x_i^r\right),$$ Equation (1)

where * denotes convolution, $x_i$ and $y_j$ are i-th input map and j-th output map respectively, $k_{ij}$ is the convolution kernel (filter) connecting the i-th input map and the j-th output map, and $b_j$ is the bias for the j-th output map. max (0, •) is the non-linear activation function, and is operated element-wise. Neurons with such non-linearity are called rectified linear units. Moreover, weights of neurons (including convolution kernels and biases) in the same map in higher convolutional layers are locally shared. Superscript r indicates a local region where weights are shared. Since faces are structured objects, locally sharing weights in higher layers allows the network to learn different high-level features at different locations.

According to an embodiment, for example, the first convolutional layer contains 20 filter pairs. Each filter pair convolves with the two face regions in comparison, respectively, and the results are added. For filter pairs in which one filter varies greatly while the other remains near uniform, features are extracted from the two input regions separately. For filter pairs in which both filters vary greatly, some kind of relations between the two input regions are extracted. Among the latter, some pairs extract simple relations such as addition or subtraction, while others extract more complex relations. Interestingly, filters in some filter pairs are nearly the same as those in some others, except that the order of the two filters are inversed. This makes sense since face similarities should be invariant with the order of the two face regions in comparison.

According to the embodiment, the output map of the convolutional neural network 130 is represented by a two-way softmax, $$y_i = \frac{\exp(x_i)}{\sum_{j=1}^{2} \exp(x_j)},\qquad \text{Equation (2)}$$

for i=1, 2, where $x_i$ is the total input maps to an output neuron i, and $y_i$ is an output of the output neuron i. $y_i$ represents a probability distribution over two classes i.e. being the same identity or not. Such a probability distribution makes it valid to directly average multiple convolutional neural network outputs without scaling. The convolutional neural networks are trained by minimizing $-\log y_t$, where $t \in \{1, 2\}$ denotes the target class. The loss is minimized by stochastic gradient descent, where the gradient is calculated by back-propagation.

In an embodiment of the present application, each convolutional neural network of the convolutional neural networks 130 may extract the relational features from a plurality of input feature modes. In addition, there may be multiple groups of convolutional neural networks, with multiple convolutional neural networks in each group, where convolutional neural networks in the same group extract the identity relational features from the same face region pair, while convolutional neural networks in different groups extract features from different face region pairs.

Figure 3:
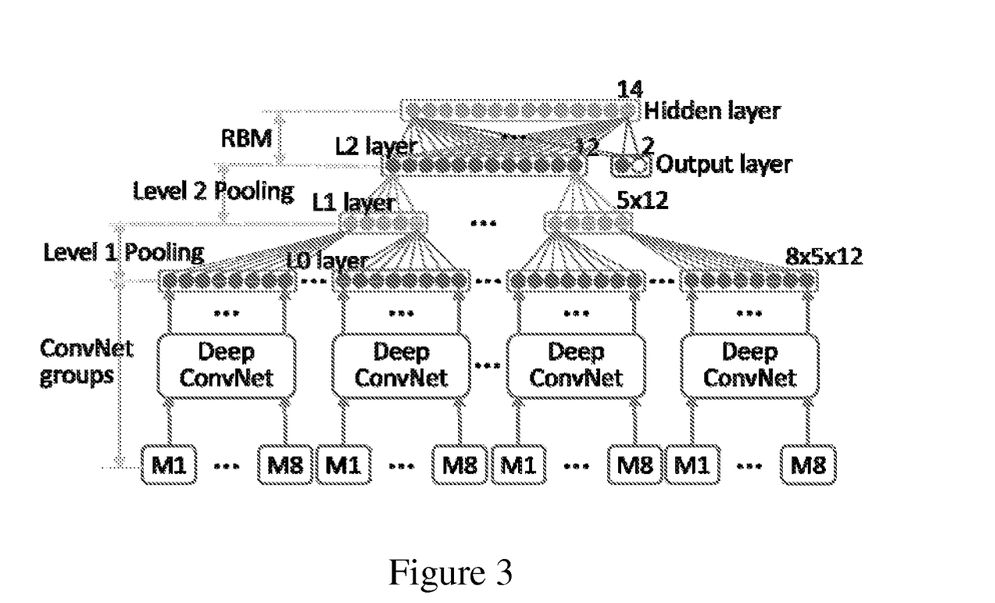
FIG. 3 is a schematic diagram illustrating architecture of the system for face image recognition consistent with some disclosed embodiments.

As shown in FIG. 1, the system 1000 may include pooling unit 140, which pools the exacted identity relational features to reduce the variance of individual features and improve their accuracy for identity relation predictions. For example, in an embodiment of the present application, two levels of average pooling over the identity relational features from the convolutional neural network outputs are used. As shown in FIG. 3, a layer L1 is formed by averaging the eight identity relation predictions of the same convolutional neural network from eight different input feature modes. A layer L2 is formed by averaging the five pooled predictions in L1 associated with the five convolutional neural networks in the same group.

The recognizing unit 150 may be configured to recognize whether the face images belong to the same identity based on the relational features extracted by the convolutional neural network unit 130, or based on the pooled relational features derived from the pooling unit 140. The recognizing unit 150 may include a classifier, such as the Bayesian classifier, Support Vector Machine, or neural network classifier, and the classifier may be configured to classify the extracted relational features as the two classes, i.e. belong to the same identity or not. In an embodiment in FIG. 3, the recognizing unit 150 is a classification restricted Boltzmann machine, which takes the output of the multiple groups of convolutional neural networks, after hierarchical pooling, as input, and output the probability distribution over the two classes, i.e., belong to the same identity or not.

For example, the classification restricted Boltzmann machine models the joint distribution between its output neurons y (one out of C classes), input neurons x (binary), and hidden neurons h (binary) as $p(y,x,h) \propto e^{-E(y,x,h)}$, where $E(y,x,h) = -h^\top Wx - h^\top Uy - b^\top x - c^\top h - d^\top y$. Given input x, the conditional probability of its output y can be explicitly expressed as $$p(y_c|x) = \frac{e^{d_c} \prod_j \left(1 + e^{c_j + U_{jc} + \sum_k W_{jk} x_k}\right)}{\sum_i e^{d_i} \prod_j \left(1 + e^{c_j + U_{ji} + \sum_k W_{jk} x_k}\right)}, \qquad \text{Equation (3)}$$

where c indicates the c-th class.

The large number of convolutional neural networks means that the system 1000 has a high capacity. Directly optimizing the whole system would lead to severe overfitting. Therefore, each convolutional neural network in the system can first be trained separately. Then, by fixing all the convolutional neural networks, the model in the recognizing unit is trained. All the convolutional neural networks and the model in the recognizing unit may be trained under supervision with the aim of predicting whether two faces in comparison belong to the same identity. These two steps initialize the system 1000 to be near a good local minimum. Finally, the whole system is fine-tuned by back-propagating errors from the model in the recognizing unit to all the convolutional neural networks.

Figure 5:
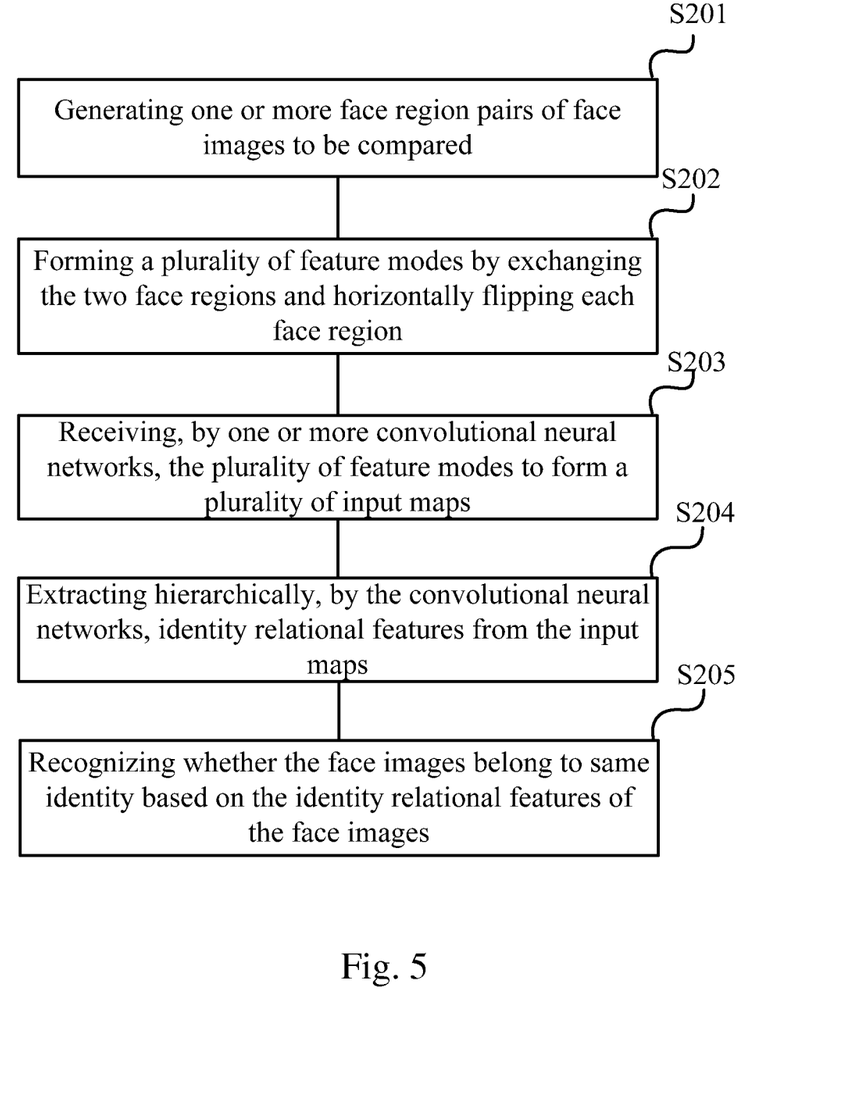
FIG. 5 is a flowchart illustrating a method for face image recognition consistent with some disclosed embodiments.

In one embodiment of the present application, the system 1000 may include one or more processors (not shown). Processors may include a central processing unit ("CPU"), a graphic processing unit ("GPU"), or other suitable information processing devices. Depending on the type of hardware being used, processors can include one or more printed circuit boards, and/or one or more microprocessor chips. In addition, the processors are configured to carry out the computer program instructions stored in a memory so as to implement the process 5000 as shown in FIG. 5.

At step S201, the system 1000 may generate one or more face region pairs of face images to be recognized. In an embodiment of the present application, the system 1000 may first detect one or more facial feature points of face images to be recognized. Then, the system 1000 may align the face images to be recognized according to the detected one or more facial feature points. Next, the system 1000 may select one or more regions on the same position of the aligned face images to be recognized to generate one or more face region pairs, respectively.

At step S202, the system 1000 may form a plurality of feature modes by exchanging two face regions of each face region pair and horizontally flipping each face region of each face region pair.

At step S203, the one or more convolutional neural networks 130 may receive the plurality of feature modes to form a plurality of input maps in the convolutional neural network and extract one or more relational features from the input maps to form a plurality of output maps, which reflect identity relations, i.e., belonging to the same person or not, of the compared face images.

At step S204, the system 1000 may pool the exacted identity relational features, such as average pooling, to reduce the variance of the individual features. This step is optional.

At step S205, the system 1000 may recognize whether the face images belong to same identity based on the identity relational features of the face images.

The embodiments of the present invention may be implemented using certain hardware, software, or a combination thereof. In addition, the embodiments of the present invention may be adapted to a computer program product embodied on one or more computer readable storage media (comprising but not limited to disk storage, CD-ROM, optical memory and the like) containing computer program codes.

In the foregoing descriptions, various aspects, steps, or components are grouped together in a single embodiment for purposes of illustrations. The disclosure is not to be interpreted as requiring all of the disclosed variations for the claimed subject matter. The following claims are incorporated into this Description of the Exemplary Embodiments, with each claim standing on its own as a separate embodiment of the disclosure.

Moreover, it will be apparent to those skilled in the art from consideration of the specification and practice of the present disclosure that various modifications and variations can be made to the disclosed systems and methods without departing from the scope of the disclosure, as claimed. Thus, it is intended that the specification and examples be considered as exemplary only, with a true scope of the present disclosure being indicated by the following claims and their equivalents.

The invention claimed is:

1. A method for face image recognition, comprising:
   generating one or more face region pairs of face images to be compared and recognized;
   forming a plurality of feature modes by exchanging two face regions of each face region pair and horizontally flipping each face region of each face region pair;
   receiving, by one or more convolutional neural networks, the plurality of feature modes, each of which forms a plurality of input maps;
   extracting, by the one or more convolutional neural networks, one or more identity relational features from the input maps to form a plurality of output maps which reflect identity relations of the compared face images; and
   recognizing whether the face images belong to the same identity based on the identity relational features of the face images.

2. The method according to claim 1, wherein the step of generating further comprises:
   detecting a plurality of facial feature points of the face images to be recognized;
   aligning the face images to be recognized according to the detected one or more facial feature points; and
   selecting a plurality of regions on the same position of the aligned face images to generate one or more face region pairs, respectively.

3. The method according to claim 1, wherein the convolutional neural network comprises a plurality of convolutional layers, the relational features comprises local low-level relational features and global high-level relational features, and the step of extracting comprises:
   extracting local low-level relational features from the input maps in lower convolutional layers of the convolutional neural network; and
   extracting global high-level relational features based on the extracted local low-level relational feature in subsequent layers of the convolutional neural network which reflect identity similarities of the compared face images.

4. The method according to claim 1, wherein after the step of extracting and before the step of recognizing, the method further comprises:
   pooling the exacted relational features to obtain stable and compact relational features.

5. The method according to claim 1, wherein the step of extracting comprises:
   extracting, by the same convolutional neural network, the relational features from the input maps formed by different input feature modes; or
   extracting, by different convolutional neural networks, the relational features from the same region of different face region pairs.

6. The method according to claim 1, wherein each face region of the face region pairs comprises a plurality of color channels, each color channel in each face region forms an input map in the convolutional neural network.

7. A system for face image recognition, comprising:
   a memory that stores executable units; and
   a processor electronically coupled to the memory to execute the executable units to perform operations of the system, wherein, the executable units comprise:
   a generating unit configured to generate one or more face region pairs of face images to be compared and recognized;
   a forming unit configured to form a plurality of feature modes by exchanging the two face regions of each face region pair and horizontally flipping each face region of each face region pair;
   one or more convolutional neural networks configured to receive the plurality of feature modes, each of which forms a plurality of input maps, and the convolutional neural networks is further configured to extract identity relational features hierarchically from the input maps, which reflect identity similarities of the compared face images; and
   a recognizing unit configured to recognize whether the face images belong to same identity based on the identity relational features of the compared face images.

8. The system according to claim 7, wherein the generating unit comprises:
   a detecting module configured to detect a plurality of facial feature points of face images to be recognized;
   an aligning module configured to align the face images to be recognized according to the detected facial feature points; and
   a selecting module configured to select one or more regions on the same position of the aligned face images to be recognized to generate one or more face region pairs, respectively.

9. The system according to claim 7, wherein the convolutional neural network comprises a plurality of convolutional layers, the identity relational features comprise local low-level relational features and global high-level relational features, and each of the convolutional layers is further configured to:
   extract local low-level relational features from the input maps in lower convolutional layers of the convolutional neural network; and
   extract global high-level relational features based on the extracted local low-level relational features in the subsequent layers of the convolutional neural network, which reflect identity similarities of the face images.

10. The system according to claim 7, further comprising a pooling unit configured to pool the exacted relational features to obtain stable and compact relational features.

11. The system according to claim 7, wherein each of the convolutional layers is further configured to:
   extract, by the same convolutional neural network, the relational features from the input maps formed by different input feature modes; or
   extract, by different convolutional neural networks, the relational features from the same region of different face region pairs.

12. The system according to claim 7, wherein each face region of the face region pairs comprise a plurality of color channels, each color channel in each face region forms an input map in the convolutional neural network.

13. A plurality of convolutional neural networks for extracting identity relational features for a face image recognition system, wherein each convolutional neural network comprises a plurality of convolutional layers, the identity relational features comprise local low-level relational features and global high-level relational features, each convolutional neural network is configured to:
- receive one particular feature mode of one particular face region pair from the face image recognition system to form a plurality of input maps;
- extract local low-level relational features from the input maps in lower convolutional layers of the convolutional neural network; and
- extract global high-level relational features based on the extracted local low-level relational features in subsequent layers of the convolutional neural network, the extracted global high-level relational features reflect identity similarities of the compared face images.

* * * * *